United States Patent Office 3,755,368
Patented Aug. 28, 1973

3,755,368
FORMYLATION OF CARBOXYLIC COMPOUNDS
WITH CARBON MONOXIDE
John Huber, Hackensack, N.J., assignor to S. B. Penick
& Company, a unit of CPC International, Inc.
No Drawing. Filed Mar. 1, 1971, Ser. No. 120,039
Int. Cl. C07d 13/04
U.S. Cl. 260—340.9                                9 Claims

ABSTRACT OF THE DISCLOSURE

A method for the preparation of 2-formyl esters. The method involves the reaction of a carboxylic compound having at least two hydrogen atoms on the carbon atom alpha to the carboxyl group with carbon monoxide, preferably under pressure. The method is particularly applicable to the preparation of 2-formyl-4-ethylenedioxy velerates. These compounds are useful as intermediates in the synthesis of valuable insecticides, e.g., 5-benzyl-3-furylmethyl chrysanthemate.

---

This invention relates to a formylation method and, in particular, to a method for the introduction of a formyl group into carboxylic esters. The formylated products are particularly useful as intermediates in the preparation of the insecticidal esters described and claimed in U.S. 3,465,007. These insecticidal esters are notably effective against a wide variety of insects and especially against houseflies.

The above insecticidal esters are prepared by the esterification of chrysanthemic or pyrethric acids with a benzyl furylmethyl alcohol. Particularly preferred are the 5-benzyl-3-furylmethyl alcohols.

Chrysanthemic and pyrethric acids correspond to the structural formula below:

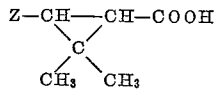

where Z, in the case of chrysanthemic acid, is isobutenyl and, in the case of pyrethric acid, is 2-carbomethoxy-prop-1-enyl. Chrysanthemic acid is commercially available and methods for the preparation of pyrethric acid are well known.

The 5-benzyl-3-furylmethyl alcohols, on the other hand, require a rather elaborate method of synthesis and they are accordingly quite expensive. They may be prepared by the methods disclosed in U.S. 3,465,007 or U.S. 3,466,304, but as indicated these methods are elaborate, requiring many steps, some of which do not produce good yields of product. The effectiveness of these insecticidal esters is so remarkable that it is highly desirable that an efficient, economical method for their preparation be available.

It is accordingly a principal object of the present invention to render more efficient the overall process for the preparation of 5-benyl-3-furylmethyl alcohols and thereby to reduce the cost of preparing pyrethroid insecticides.

It is also an object of the present invention to provide an improved process for the preparation of formylated carboxylic esters.

It is also an object of the present invention to provide an improved process for the preparation of alkali metal salts of 2-formyl carboxylic esters.

These and other objects of the present invention are accomplished by a process for preparing alkali metal salts of 2-formyl carboxylic esters comprising reacting a carboxylic acid, ester, or amide, or a nitrile, having at least two hydrogen atoms on the carbon atom alpha to the carboxylic or nitrile group, with carbon monoxide in the presence of an alkali metal alcoholate, and preferably in an inert solvent. The carboxylic compound may be represented by the formula —$CH_2X$ where X is carboxyl carboxylic ester, carboxamide or nitrile. Carboxylic esters are prepared, particularly those in which the esterifying radical is a lower alkyl group, i.e., having up to six carbon atoms.

The reaction of the above process is illustrated by the following equation:

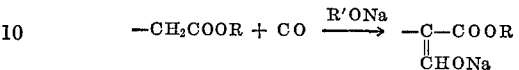

where R and R' are alkyl groups, preferably lower alkyl groups having up to six carbon atoms. The above sodio product may be converted to the corresponding 2-formyl ester merely by treatment with acid at room temperature. The reaction illustrated above may be carried out at room temperature although ordinarily it is desirable to employ a slightly higher temperature, i.e., about 40°–100° C. As one would expect, higher reaction temperatures favor a faster reaction rate. Temperatures within the range of from about 10° C. to about 100° C. are contemplated.

The formylation reaction generally is carried out under superatmospheric pressure although it may be carried out at atmospheric pressure. In this latter instance, the carbon monoxide simply is bubbled through a mixture of other reactants. Ordinarily, however, it is advisable to pressure the reaction mixture with carbon monoxide so as to shorten the time required for completion of the reaction. Pressures up to 100 atmospheres are contemplated although the reaction may be conducted quite satisfactorily at a pressure ranging from about 5 p.s.i.g. to about 100 p.s.i.g. Higher pressures do not afford any significant advantage although they may be used without disadvantage, if desired. Although it is preferred to use gaseous carbon monoxide as such, this reactant may be prepared in situ by the reaction of calcium carbonate and zinc dust, or (at elevated pressures) by the decomposition of a dialkyl carbamate such as diethyl carbamate.

The time required for the reaction may vary widely depending on the size of the reaction mixture, the temperature and the pressure. Ordinarily, the reaction requires from about 5 to about 30 hours. The reaction mixture should be agitated to insure intimate mixing of the reactants and a relatively brief reaction time.

The alkali metal alcoholate generally is a lower alcoholate, i.e., it is derived from a lower alcohol such as methyl or ethyl alcohol. By "lower alcohol" is meant an alkanol having up to six carbon atoms, including methyl, ethyl, propyl, butyl and amyl alcohols. Ethylates and methylates are preferred, and methylates are particularly preferred. Higher alcoholates derived from alkanols having up to and including 10 carbon atoms may also be used, however. With respect to the alkali metal portion of the alcoholate, sodium alcoholates are preferred. The amount of alkali metal alcoholate which should be used in the process may vary from about one mole to about five moles per mole of the carboxylic or nitrile reactant. Ordinarily, about two moles are used and there appears to be no significant advantage in using more than five moles although more may be used, if desired. One advantage of the process is the lesser amounts of alkali metal alcoholate are required, for the attainment of optimum yields, than are required in prior art processes.

When a carboxylic ester is used as the reactant, if the particular alkali metal alcoholate is derived from an alcohol which is different from that with which the carboxylic esters is esterified then, because of transesterification, the resulting product will be a mixture of esters. For the principal purpose of this invention, i.e., the preparation of pyrethriod insecticides, this is unimportant, because these ester groups are subsequently reduced to alcohol groups. If, however, one wishes to use the 2-formyl product for some other purpose it may well be desirable or necessary to choose an alkali metal alcoholate having an alkyl radical similar to that of the carboxylic ester.

For optimum yields, it is desirable to add a lower alcohol, i.e., one having up to about 6 carbon atoms, to the reaction mixture. Methanol, ethanol, isopropyl, alcohol, n-butyl alcohol and tert-amyl alcohol are examples of such alcohols. Ethanol is preferred. Only very small amounts are required for this purpose, i.e., as little as about 0.5 mole per mole of carboxylic or nitrile reactant. More than this may be used and, in fact, a very large amount can be used to serve as the inert solvent.

The inert solvent when used generally is hydrocarbon solvent such as benzene, toluene, cyclohexane, heptane and the like. The character of the solvent is not critical, so long as it does not contain reactive substituent groups which interfere with the desired reaction. Chlorinated hydrocarbons such as trichloroethylene, carbon tetrachloride, chlorobenzene and dichlorobenzene may be used although hydrocarbon solvents are preferred, especially aromatic hydrocarbon solvents.

Consideration of the equation appearing above shows why it is necessary that the carboxylic or nitrile starting material have at least two hydrogen atoms on the carbon atom alpha to the carboxylic or nitrile group. These two hydrogen atoms do not appear in the sodium enolate product, being replaced by the sodio hydroxymethylene (HC—ONa) group. The reaction is generally applicable to such carboxylic compounds and nitriles and is particularly useful in its application of 4-ethylenedioxy-5-aryl valerates and the corresponding amides, acids and nitriles. The aryl group may contain as many as three aromatic rings, i.e., it may be phenyl, naphthyl, anthracyl, etc., or it may contain lower alkyl, lower alkoxy or halo substituents. Thus, it may be chlorophenyl, or anisyl, or 4-methyl-1-naphthyl, or ethyl phenyl. By "lower" is meant an alkyl or alkoxy substituent containing up to 6 carbon atoms.

Particularly contemplated and preferred are phenyl and substituted phenyl where the substituent is relatively inert. Chlorophenyl, bromophenyl, p-totyl, xylyl, xenyl, anisyl, p-ethoxyphenyl, etc. are illustrative. Such utility is based upon the use of the metal enolate product which results, in the further preparation of the chrysanthemate and pyrethrate esters referred to earlier herein. Such reaction is illustrated in terms of the 5-phenyl valerate, as follows:

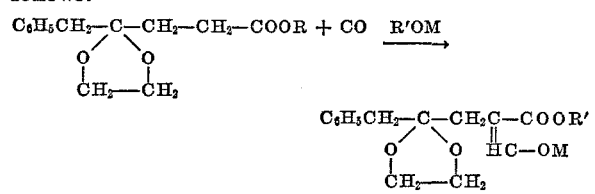

where R and R' are alkyl groups, preferably lower alkyl groups, and M is an alkali metal. The lower alkyl groups contemplated herein as R and R' are those having up to 6 carbon atoms.

The process herein is characterized by several advantages with respect to the processes of the prior art. It requires a relatively short time, i.e., in some cases as little as a few hours. Also, it avoids the use of dangerous reactants such as sodium hydride and ether which are quite flammable. Also, the yields are high, i.e., generally, greater than 90% of the theory. Still further, the prior art processes require the use of large quantities of ethyl formate, which is expensive and which decomposes during the reaction to provide large quantities of carbon monoxide which must be recovered and disposed of in some other form so as to eliminate the toxic danger associated with this material. Despite the fact that it is preferred to use carbon monoxide as such in the process of this invention there is very little unreacted carbon monoxide to dispose of, i.e., much less than that which results from the prior art processes. Another advantage is the absence of foaming of the reaction mixture. Previous processes have been characterized by excessive foaming which is not ameanable to treatment with the ordinary anti-foam agents and which reduces significantaly the effective volume of reaction equipment.

The process is illustrated by the following examples which are not, however, to be taken as limiting. All parts and percentages are by weight, unless otherwise expressly stated.

EXAMPLE 1

Preparation of ethyl-2-formyl 4-ethylene-dioxy-5-phenyl valerate

A 1-liter autoclave equipped with an agitator is charged with 600 ml. of toluene, 52.8 g. (0.2 mole) of ethyl-4-ethylenedioxy-5-phenyl valerate, 21.6 g. (0.4 mole) of sodium methylate and 9.2 g. (0.2 mole) of ethyl alcohol. The autoclave is sealed, purged with nitrogen, then pressured with carbon monoxide to 50 p.s.i.g. The resulting mixture is stirred at 50° C. for 15 hours, the pressure being maintained with carbon monoxide at 50 p.s.i.g. throughout this period. The resulting ethyl-2-(sodio)hydroxymethylene-4-ethylenedioxy-5-phenyl valerate is isolated by filtration. The solid product is converted to the corresponding 2-formyl compound by neutralization with 10% aqueous acetic acid and extraction with benzene. The benzene extract is washed with water, dried with sodium sulfate, then evaporated to a liquid residue weighing 51.4 g. (91.7% of the theory). Infrared analysis shows the presence of a carbonyl absorption at 6.1$\mu$ as well as that originally present in the infrared spectrum of the sodium enolate at 5.7$\mu$.

EXAMPLE 2

The present of Example 1 is repeated, except that the temperature of the reaction mixture is 70° C. and the duration of the reaction is 20 hours. The yield of ethyl-2-formyl 4-ethylenedioxy-5-phenyl valerate is 54.5 g. (97.1% of the theory).

EXAMPLE 3

The procedure of Example 1 is repeated using cyclohexane instead of toluene as the solvent. Similar results are obtained.

EXAMPLE 4

Similar results are obtained from the procedure of Example 1 using 3% aqueous hydrochloric acid instead of the acetic acid.

EXAMPLE 5

A 1-liter autoclave equipped with an agitator is charged with 600 ml. of toluene, 52.8 g. (0.2 mole) of ethyl-4-ethylenedioxy-5-phenyl-valerate and 21.6 g. (0.4 mole) of sodium methylate. The autoclave is sealed, purged with nitrogen then pressured with carbon monoxide to 50 p.s.i.g. The resulting mixture is agitated at 50° C. for 15 hours, under a carbon monoxide pressure of 50 p.s.i.g. The resulting ethyl-2-(sodio)hydroxymethylene-4-ethylenedioxy-5-phenyl valerate is isolated by filtration and converted to the corresponding 2-formyl compound as in Example 1. The yield is 36.4 g. (65% of the theory).

The 2-formyl ester prepared by procedures above may be used in the preparation of valuable insecticides by the processes set forth in U.S. Pat. 3,466,304. According to the process of this patent the 2-formyl ester (or its alkali metal enolate) is cyclized to form the substituted furoic acid ester which then is reduced to the corresponding 3-furyl alcohol. Esterification of this alcohol with chrysanthemic acid (as shown in U.S. Pat. 3,465,007) yields a very effective insecticide.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A process for preparing alkali metal salts of 2-formyl carboxylic esters comprising reacting a lower alkyl ester of a 4-ethylenedioxy valeric acid, said ester having the structural formula:

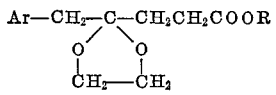

wherein Ar is phenyl, or a phenyl containing an inert substituent group and R is a lower alkyl group, with carbon monoxide at a pressure of from about 20 p.s.i.g. to about 200 p.s.i.g., in the presence of an alkali metal alcoholate of a lower alkanol.

2. The process of claim 1 wherein the alkali metal alcoholate is a sodium alcoholate.

3. The process of claim 1 wherein the reaction is carried out at a temperature within the range of from about 40° C. to about 100° C.

4. A process for preparing 2-formyl carboxylic esters comprising reacting an alkali metal salt prepared by the process of claim 1, with an acid.

5. The process of claim 4 wherein the acid is acetic acid.

6. A process for preparing sodium salts of 2-formyl carboxylic esters comprising reacting ethyl-5-phenyl-4-ethylenedioxy valerate with carbon monoxide at a pressure of from about 5 p.s.i.g. to about 200 p.s.i.g., in the presence of a stoichiometric excess of sodium alcoholate of a lower alkanol, and in an inert hydrocarbon solvent.

7. A process for preparing 2-formyl carboxylic ester comprising reacting a sodium salt prepared by the process of claim 4, with an acid.

8. The process of claim 5 wherein the acid is acetic acid.

9. The proces of claim 6 wherein the process is carried out in the presence of a lower alcohol.

References Cited

UNITED STATES PATENTS 3,567,744   3/1971   Tanaka et al. _____ 260—340.9 X

ALEX MAZEL, Primary Examiner

J. H. TURNIPSEED, Assistant Examiner

U.S. Cl. X.R.

260—347.4; 424—285